United States Patent [19]

Sturm et al.

[11] 3,709,377
[45] Jan. 9, 1973

[54] TOOL CHANGER
[75] Inventors: Walter V. Sturm; Claude S. Doll, both of Sidney, Ohio
[73] Assignee: The Monarch Machine Tool Company
[22] Filed: July 31, 1970
[21] Appl. No.: 60,021

[52] U.S. Cl. ................................ 214/1 BD, 29/568
[51] Int. Cl. ............................................. B23q 3/155
[58] Field of Search ....... 214/1 B, 1 BC, 1 BD, 1 CM; 29/568

[56] References Cited

UNITED STATES PATENTS

| | | | |
|---|---|---|---|
| 3,066,805 | 12/1962 | Sullivan | 214/1 CM |
| 2,259,728 | 10/1941 | Bridges | 214/1 BC X |
| 3,406,836 | 10/1968 | Manetta | 214/1 BD |
| 2,679,940 | 6/1954 | Goertz | 214/1 CM |
| 3,449,822 | 6/1969 | Laumann | 29/568 |
| 3,492,717 | 2/1970 | Seidel | 29/568 |
| 3,546,774 | 12/1970 | Stoferle | 29/568 |

Primary Examiner—Gerald M. Forlenza
Assistant Examiner—George F. Abraham
Attorney—Woodling, Krost, Granger and Rust

[57] ABSTRACT

A tool changer as shown which moves in first, second and third different paths in moving a tool adapter from an operating spindle to a position adjacent a tool storage magazine. The tool adapter grip is moved by grip means in the third path, is moved by power means in the second path and is moved by motive means in the first path. The power means is also controlled so as to move the tool adapter grip in a fourth path different from the first, second and third paths.

20 Claims, 7 Drawing Figures

PATENTED JAN 9 1973

INVENTORS
WALTER V. STURM
BY CLAUDE S. DOLL
Woodling, Krost,
Granger and Rust
ATTORNEYS.

INVENTORS.
WALTER V. STURM
CLAUDE S. DOLL
BY Woodling, Krost,
Granger and Rust
ATTORNEYS.

TOOL CHANGER

BACKGROUND OF THE INVENTION

Tool changers have been used to change tools or more properly to change tool adapters between an operating spindle and a tool storage magazine. In many cases these tool changers have incorporated a double-ended arm in order to effect the final tool transfer from a tool ready station to the operating spindle and to simultaneously transfer the used tool from the operating spindle to the tool ready station. A separate tool transfer mechanism is required in order to transport the used tool back to the tool magazine and then after movement of the magazine to select a new tool to transport it to the tool ready station. This requires in effect two different tool transport mechanisms together with the associated controls for each and as a result the entire tool change mechanism has become quite cumbersome and complex.

Accordingly, an object of the invention is to provide a tool changer which eliminates this double tool transport mechanism.

Another object of the invention is to provide a tool changer which is fast and relatively simple in changing a tool between the operating spindle and the tool storage magazine.

Another object of the invention is to provide a tool changer which pivotally moves on three different axes in sequence for relatively rapid tool change and to move the tool to a tool storage magazine which is close to, yet not interfering with, the machining area.

Another object of the invention is to provide a tool changer which moves in three distinct paths for simple and rapid tool change.

Another object of the invention is to provide a tool changer with relatively short pivot arms to move the tool rapidly with a minimum of inertia so as to permit rapid tool change considering the size of the tools.

SUMMARY OF THE INVENTION

The invention may be incorporated in a tool changer to change tool adapters between an operating spindle and a tool storage magazine having sockets, comprising, in combination, a first part mounted for movement in a first path, a second part mounted for movement in a second path at an angle to said first path, one of said parts being carried by the other, a tool adapter grip mounted on the carried part for movement in a third path at an angle to said first and second paths, grip means to cause movement of said grip in said third path to grip an adapter in the operating spindle, power means to cause movement of said second part and the tool adapter in said second path, and motive means to cause movement of said first part in said first path to move the tool adapter adjacent to a socket in the tool storage magazine.

Other objects and a fuller understanding of the invention may be had by referring to the following description and claims, taken in conjunction with the accompanying drawing.

DESCRIPTION OF THE PREFERRED EMBODIMENT

Figure 1:
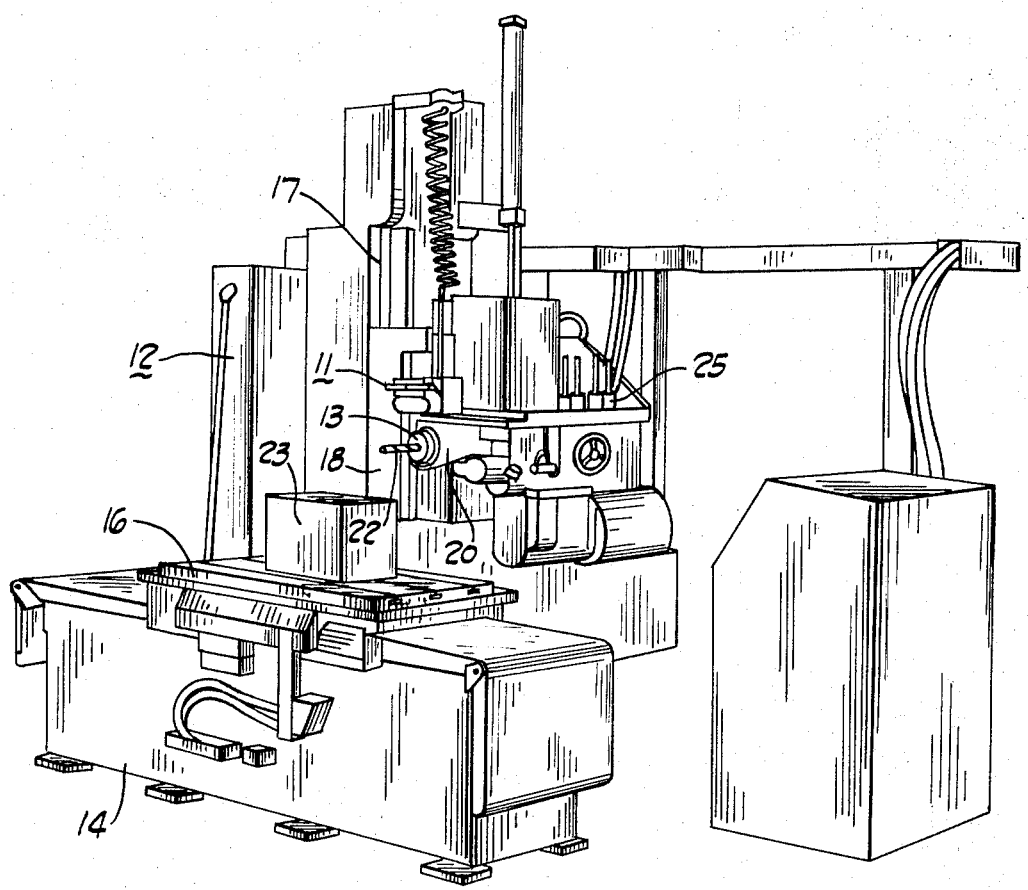
FIG. 1 is a perspective view of a machine tool having a tool changer embodying the invention.

The tool changer 11 of the invention is shown as incorporated in a machine tool 12 having a horizontal spindle 13 and this is the preferred embodiment although it will become readily apparent to those skilled in the art that other modifications may be employed, for example, a vertical spindle. The machine tool 12 has a fixed frame 14. A reciprocating table 16 reciprocates on the frame 14 along an X-axis. A fixed column 17 is carried on the frame 14 and a ram carrier 18 moves vertically on this fixed column along a Y-axis. A sliding ram 20 is slidably mounted on the ram carrier 18 for horizontal movement along a Z-axis. Each of these movements along the respective axes may be powered in any of the usual manners.

The horizontal spindle 13 is rotatable in the ram 20 on this Z-axis and is adapted to carry any of a plurality of tools 22 to operate on a workpiece 23 fastened in a suitable manner on the reciprocating table 16. Typical tools may be drilling, tapping, milling and like tools for performing typical cutting functions on the workpiece 23.

A tool storage magazine 25 is mounted on the ram carrier 18 just above the spindle 13 and positioned out of the way to the rear of the front face of the machine whereat the tool 22 at that time in the operating spindle 13 may operate on the workpiece. This tool storage magazine selectively provides a plurality of tools in upwardly directed sockets so that the tools rest therein by gravity. This makes it easy to insert and remove the selected one of the tool adapters 27, which are all identical and in which the different tools 22 are mounted. The tool changer 11 interchanges these identical tool adapters 27 between the operating spindle 13 and the tool storage magazine 25. The particular tool storage magazine shown in this preferred embodiment is a chain type having sockets 28 on an endless chain 29 to receive the tool adapters. The chain is selectively movable to provide a selected socket at a tool change station at the front of a chain sprocket 30 whereat the sockets are spread apart for easy access to the tool in the socket.

Figure 2:
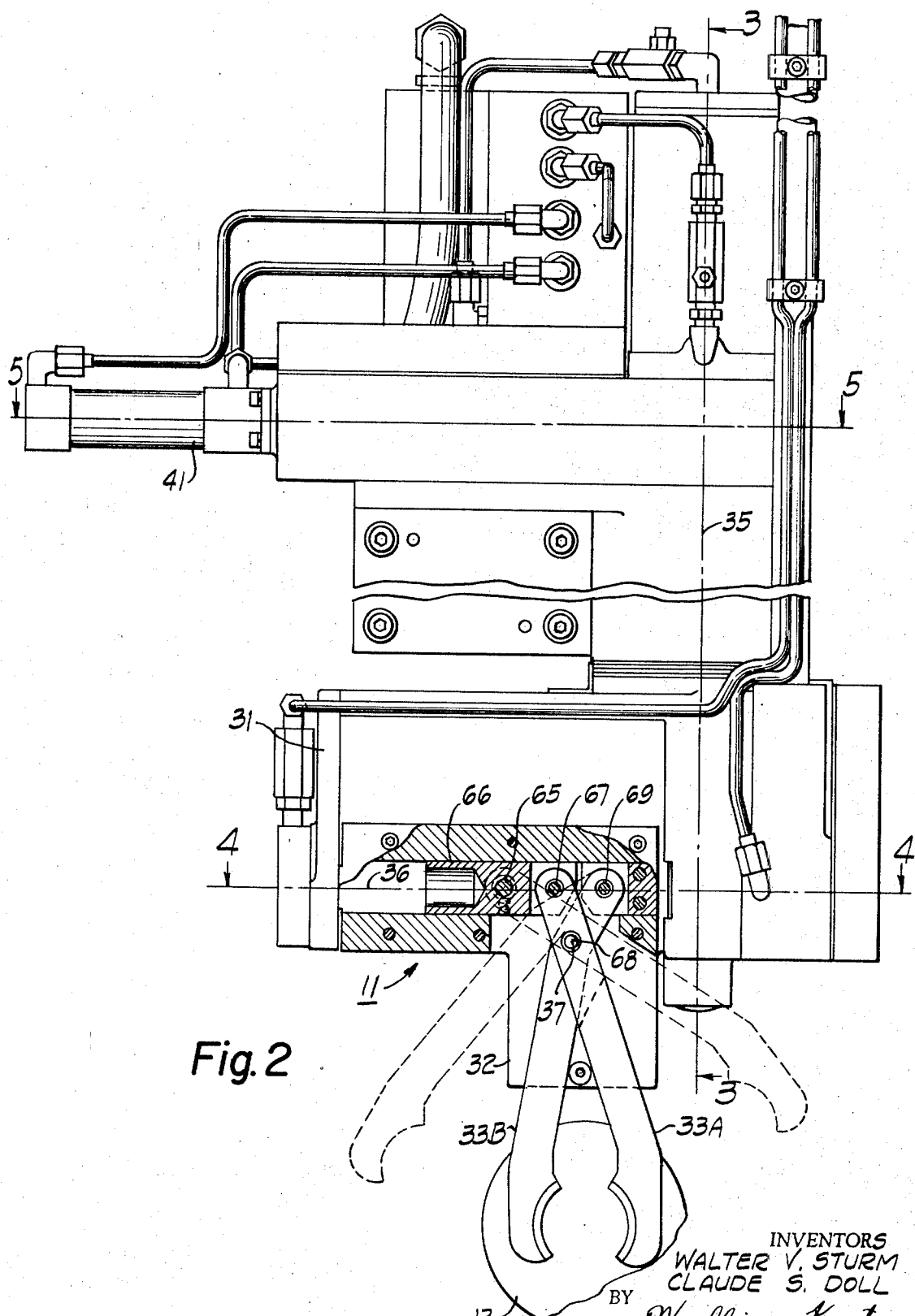
FIG. 2 is a front view of the tool changer.
Figure 3:
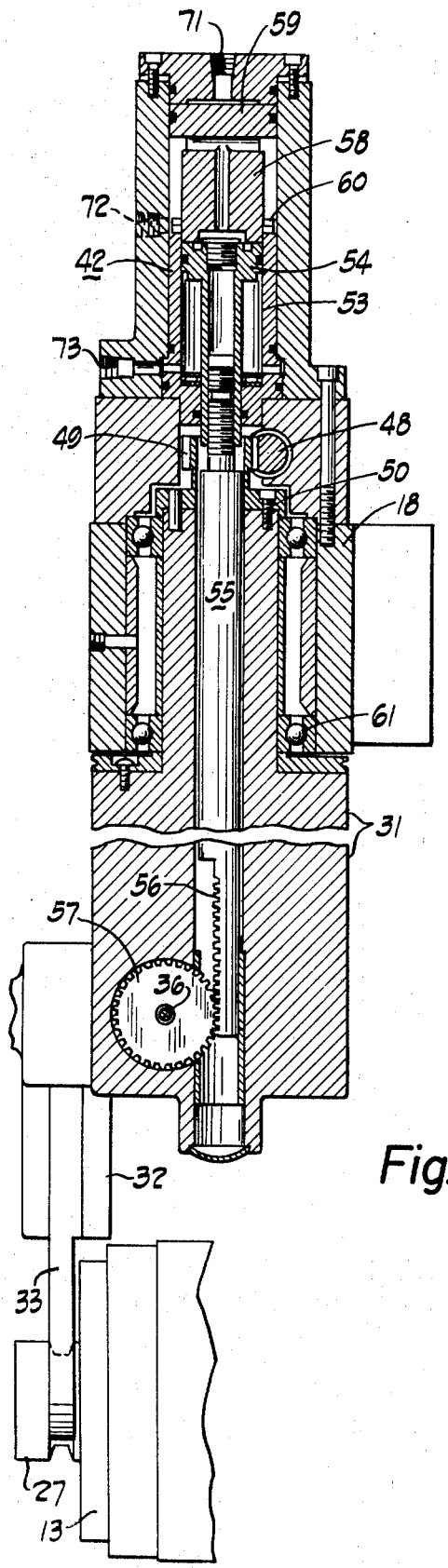
FIG. 3 is a vertical section on line 3—3 of FIG. 2.

The tool change is effected at the time when the ram 18 is retracted away from the workpiece to a home position at which it is adjacent and immediately beneath the tool changer 11. The tool changer includes generally first, second and third parts 31, 32 and 33, respectively. The first part is shown in FIGS. 2 and 3 and is a housing 31 which is movable in a first path. In this preferred embodiment it moves in a horizontal path in a horizontal first plane and this path is arcuate about a first axis 35 which is vertical. The second part of the tool changer is a bracket 32 which is movable in a second path. In this preferred embodiment the second path is in a vertical second plane and the second path is arcuate pivoting about a second axis 36. The third part of the tool changer 11 is a tool adapter grip 33. This tool adapter grip 33 may be considered as fingers which move in a third path different from the first and second paths. In this preferred embodiment the third path is in a third plane which plane is vertical as shown in FIG. 2, and this plane is at an angle to the second plane of movement of the bracket 32. The third path of movement of the tool adapter grip 33 is an arcuate movement in this third plane as pivoting around a third axis 37. This third axis is at right angles to the second axis 36 and also at right angles to the first axis 35. Each of these three axes is slightly displaced from the other as best seen in FIG. 2. One of the first and second parts carries the other thereof for compound movement and in this preferred embodiment the second part or bracket 32 is carried on the first part or housing 31.

Figure 5:
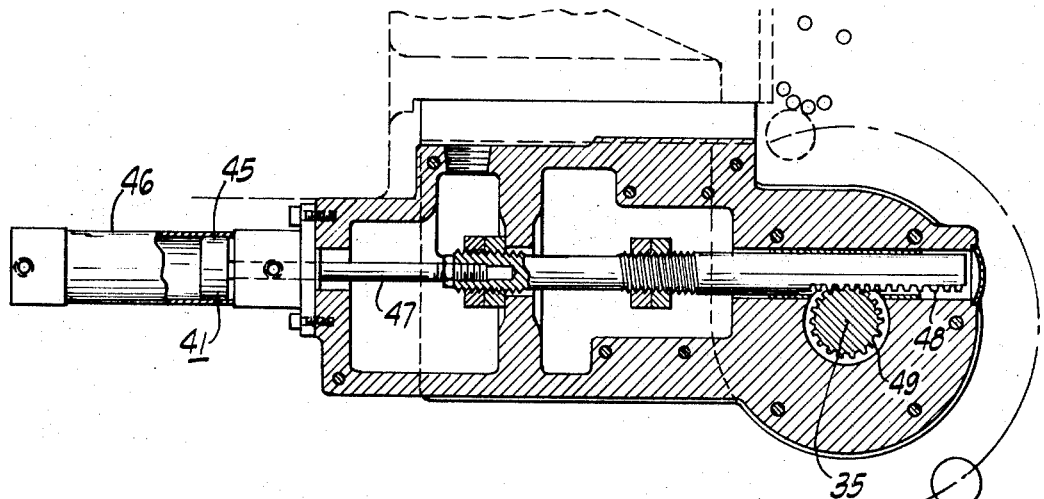
FIG. 5 is a section on line 5—5 of FIG. 2.
Figure 6:
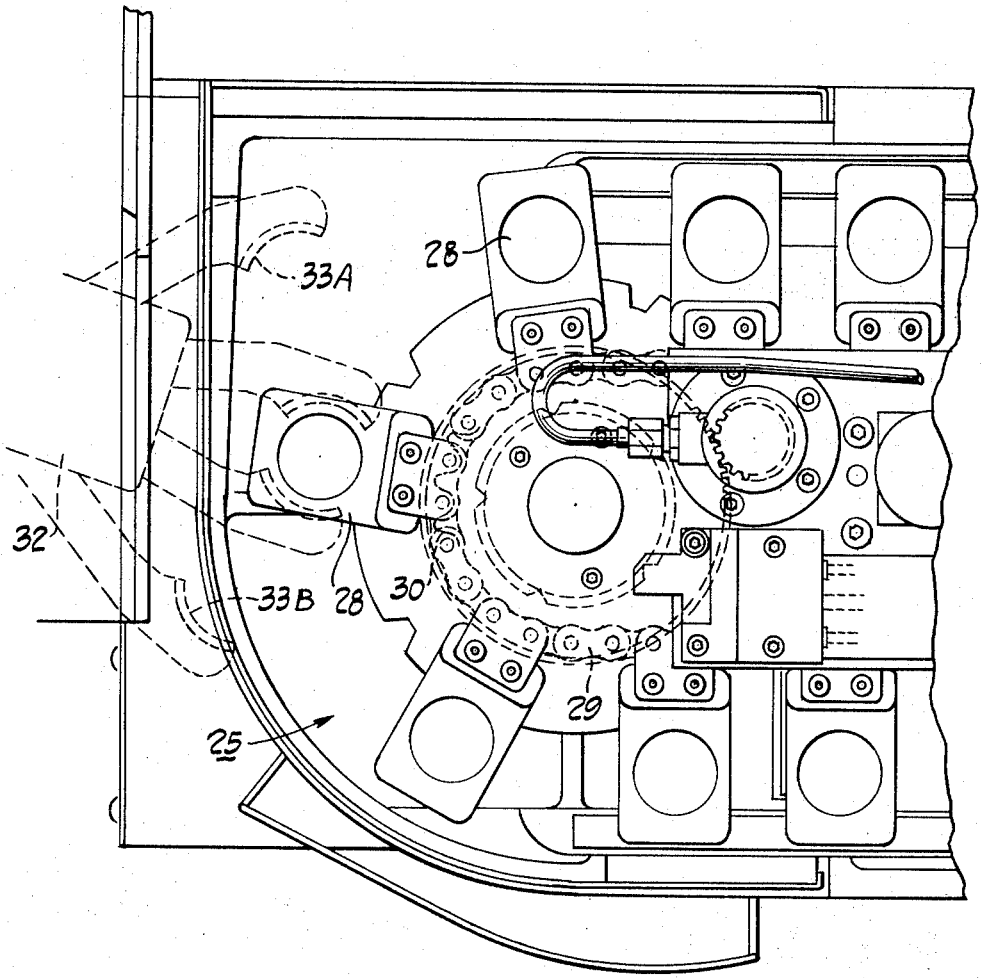
FIG. 6 is a top view showing a part of the tool storage magazine.

Motive means 41 is provided to move the first part 31 and power means 42 is provided to move the second part 32. Additionally grip means 43 is provided to actuate the tool adapter grip 33. The motive means 41 actuates the housing 31 around the vertical first axis 35. This is illustrated in FIG. 5 and includes a piston 45 in a cylinder 46 actuated by suitable fluid such as oil. The piston 45 is connected by a piston rod 47 to a rack 48 which rotates a pinion 49 through a suitable angle which in this preferred embodiment is about 162°. The pinion 49 is fastened by bolts 50 to the housing or first part 31.

The power means 42 to actuate the tool changer bracket 32 in its second path includes a cylinder 53 in which a piston 54 reciprocates vertically by a suitable fluid such as oil. The piston 54 is connected by a piston rod 55 to a rack 56 meshing with a pinion 57. This pinion 57 is fixed to the bracket or second part 32 to move the same in the second path. This second path is an arcuate path about the second axis 36 in a vertical second plane which is in the plane of the paper of FIG. 3. A floating piston 58 is also carried in the upper part of cylinder 53 and has an enlarged head 59 which may engage a shoulder 60 when the floating piston 58 is moved downwardly. The housing 31 is journalled for rotation by bearings 61 on the ram carrier 18.

Figure 4:
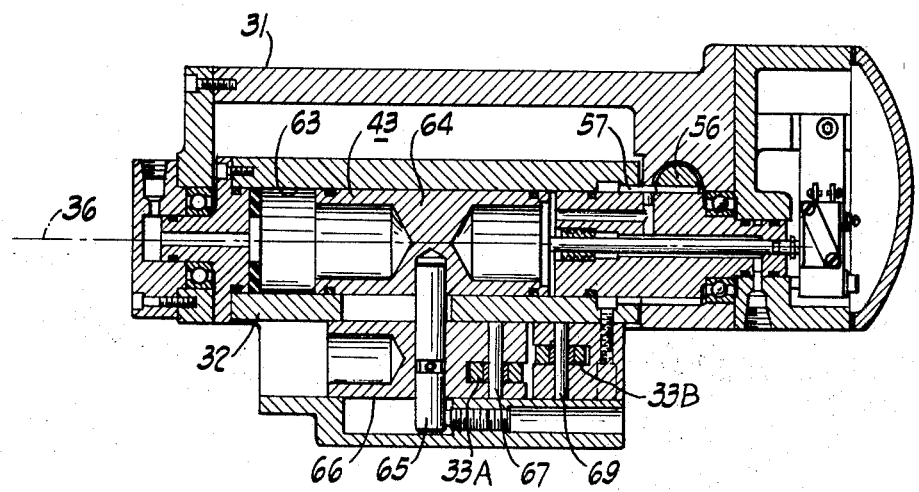
FIG. 4 is a section on line 4—4 of FIG. 2.

The grip means 43 to actuate the tool adapter grip 33 includes a cylinder 63 contained within the bracket 32, see FIG. 4. A piston 64 is reciprocable in the cylinder 63 by a suitable fluid such as air. The piston carries a transverse pin 65 which extends into a guide piston 66. This guide piston 66, also shown in FIG. 2, is pivotally connected at 67 to the inner end of one grip finger 33A. A pivot pin 68 along the third axis 37 pivotally interconnects the grip finger 33A with another grip finger 33B. The inner end of this grip finger 33B is pivotally mounted on a pivot 69, which is fixed relative to the bracket 32. In this manner reciprocation of the piston 64 pivots open and closed the tool adapter grip 33.

OPERATION

Figure 7:
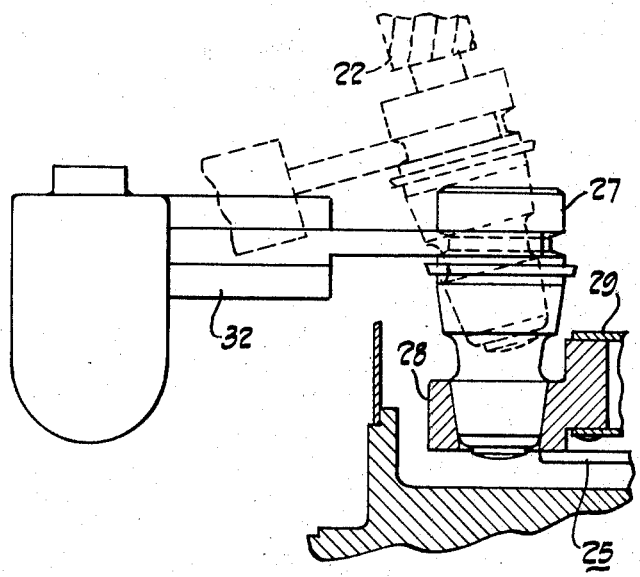
FIG. 7 is a side elevation illustrating part of the tool changer and tool storage magazine.

The tool changer 11 sequentially moves a tool adapter with a selected tool therein through first, second and third different paths in moving the tool adapter between the operating spindle 13 and the tool storage magazine 25. The tool adapter grip 33 moves in an arcuate third path in the plane of the paper of FIG. 2 to close upon and grip a tool adapter in the operating spindle 13. After the internal lock in the spindler 13 has released the adapter, the power means 42 actuates the bracket 32 and the gripped tool adapter in a vertical arcuate second path. This would be in the plane of the paper of FIG. 3. By movement in this second path the tool adapter is elevated to a level above the level of the upwardly directed tool sockets 28 in the tool storage magazine 25. This is shown in phantom in FIG. 7. Subsequently the power means 41 moves the tool adapter grip 33, the bracket 32 and the housing 31 in an arcuate first path which is in a horizontal plane. This first path movement is through a suitable arc which in this preferred embodiment is about 162°. The movement swings the gripped tool adapter from a forwardly facing position to one facing rearwardly and at a position above and adjacent to a selected socket 28 in the tool storage magazine 25. It will then be in the position shown in phantom in FIG. 7. Subsequently the power means 32 is actuated to lower the adapter 27 into the pre-selected socket 28. It does this by moving the adapter and the tool adapter grip 33 in a fourth path. In this preferred embodiment the fourth path is in a vertical fourth plane at an angle to the vertical second plane. This is because the motive means 41 has rotated the housing 31 through an angle of about 162°.

Next the tool adapter grip 33 is actuated by the grip means 43 to open the fingers 33A and 33B. This releases the previously used tool in the tool adapter 27 to be stored in that particular socket in the tool storage magazine 25. This permits the tool storage magazine to be indexed for the next selected tool to be placed at the tool selection station at the front of the sprocket 30. The grip means 43 is then actuated to close the fingers 33A and 33B on the tool adapter of the next selected tool. The power means 42 is actuated to lift the adapter 27 to an elevation above the socket 28. This may be through an angle of about 15° above the horizontal as shown in the phantom line position of FIG. 7. Next the power means 41 is actuated to return the housing 31 through an angle of about 162° so that the new tool is facing forwardly. The power means 42 is actuated to move the bracket 32, tool adapter grip 33 and the new tool downwardly in the second path. This motion is through an angle of about 105° to place the selected tool adapter in the operating spindle 13. The internal mechanism of the spindle may lock this adapter in place and then the fingers 33A and 33B may be spread apart by the grip means 43. If desired, for appearance or for clearance as the ram 20 moves forwardly to work on the workpiece, the bracket 32 may be swung upwardly 90° or 105° to an upper position.

The mechanism by which the power means 42 may be actuated through the second path and be moved in either a 90° arc, a 15° arc or a 105° arc is because of the floating piston 58. FIG. 3 shows the fingers 33 in the lower position which means that the rack 55 is raised to its fullest extent. To accomplish these three movements, oil is applied selectively in ports 71, 72 and 73. With oil under pressure in port 73, this will raise both the piston 54 and the floating piston 58 to the upmost position shown in FIG. 3. With oil under pressure applied to ports 71 and 72 but not in port 73, this forces the floating piston head 59 down against the shoulder 60 and piston 54 continues downwardly to separate from piston 58 because of the pressure in port 72. Accordingly, rack 56 goes to its lower-most position which means that the bracket 32 is rotated 105° to the extreme upper position shown in phantom in FIG. 7. Now after the tool adapter grip 33 has rotated on axis 35 to be above the socket 28, it is desired to swing the tool adapter grips 33 downwardly only 15° to set the adapter in the socket. To accomplish this, fluid pressure is applied to ports 71 and 73 but not 72. This raises the lower piston 54 up against the floating piston 58 which remains in its down position against shoulder 60. Accordingly piston 54 moves upwardly only a short distance and this lowers the tool adapter grip 33 the 15° movement. After the used tool has been deposited, the fingers opened, the tool storage magazine indexed to a new position, and the fingers closed on a new tool adapter, the tool adapter grip 33 is raised upwardly through 15°. This is accomplished by oil pressure in ports 71 and 72. The tool adapter grip 33 is now in the upmost position ready to be rotated on axis 35 and then be lowered through an angle of 105° to insert the new tool adapter in the operating spindle 13. This is accomplished by oil pressure in port 73.

After the fingers 33A and 33B have opened, if it is desired to raise the bracket 32 through only a 90° angle, this is accomplished by oil pressure on ports 71 and 73.

Suitable limit switches are provided to determine the end of movement of each of the component parts to actuate solenoid valves controlling the various fluid motors. These may be arranged in well-known electrical and fluid circuits.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A tool changer to change tool adapters between an operating spindle and a tool storage magazine having sockets,
  comprising, in combination, a first part mounted for movement in a first path in a first plane,
  a second part mounted for movement in a second plane in a second path at an angle to said first path, one of said parts being carried by the other,
  a tool adapter grip mounted on the carried part for movement in a third path at an angle to said first and second paths,
  grip means to cause movement of said grip in said third path to grip an adapter in the operating spindle,
  power means to cause movement of said second part and the tool adapter in said second path,
  motive means to cause movement of said first part in said first path to move the tool adapter adjacent to a socket in the tool storage magazine,
  and means to control said power means to move the tool adapter in a fourth path located in a plane which is different from the planes containing said first, second and third paths.

2. A tool changer as set forth in claim 1, wherein said first path is in a horizontal first plane.

3. A tool changer as set forth in claim 1, wherein said second path is in a vertical second plane.

4. A tool changer as set forth in claim 1, wherein said third path is in a vertical third plane at an angle to said second plane.

5. A tool changer as set forth in claim 2, wherein said second path is in a vertical second plane, and said third path is in a third plane at an angle to said second plane.

6. A tool changer as set forth in claim 5, wherein said third plane is perpendicular to said second plane.

7. A tool changer as set forth in claim 5, wherein said third plane is a vertical plane perpendicular to each of said first and second planes.

8. A tool changer as set forth in claim 5, wherein said means to control said power means moves the tool adapter in said fourth path to deposit a tool adapter in a socket in a tool storage magazine.

9. A tool changer as set forth in claim 8, wherein said fourth path is in a vertical fourth plane at an angle to the second and third planes.

10. A tool changer as set forth in claim 1, wherein said first path is an arcuate path.

11. A tool changer as set forth in claim 1, wherein said second path is an arcuate path.

12. A tool changer as set forth in claim 1, wherein said third path is an arcuate path.

13. A tool changer as set forth in claim 1, wherein said first path is an arc of a circle around a first axis.

14. A tool changer as set forth in claim 13, wherein said first axis is vertical.

15. A tool changer as set forth in claim 1, wherein said second path is an arc of a circle around a second horizontal axis.

16. A tool changer as set forth in claim 1, wherein said third path is about a horizontal third axis at an angle to said second horizontal axis.

17. A tool changer as set forth in claim 1, wherein said second and third paths are arcuate paths.

18. A tool changer as set forth in claim 1, wherein said first part carries said second part.

19. A tool changer as set forth in claim 1, wherein the sockets in the tool storage magazine are upwardly directed, and said power means moves the tool adapter to a position above the level of a socket in the tool storage magazine.

20. A tool changer to change tool adapters between an operating spindle and a tool storage magazine having sockets,
  comprising, in combination,
  a first part mounted for movement in a first path,
  a second part mounted for movement in a second path at an angle to said first path,
  one of said parts being carried by the other,
  a tool adapter grip mounted on the carried part for movement in a third path at an angle to said first and second paths,
  grip means to cause movement of said grip in said third path to grip an adapter in the operating spindle,
  power means to cause movement of said second part and the tool adapter in said second path,
  motive means to cause movement of said first part in said first path to move the tool adapter adjacent to a socket in the tool storage magazine,
  means to control said power means to move the tool adapter in a fourth path different from said first, second and third paths, said power means including an adjustable stop to establish said fourth path movement of shorter length than said second path movement, and said power means including a fluid piston and cylinder and including a floating piston as said adjustable stop.

* * * * *